United States Patent
Moyal et al.

(10) Patent No.: US 6,834,058 B1
(45) Date of Patent: Dec. 21, 2004

(54) SYNCHRONIZATION AND ALIGNMENT OF MULTIPLE VARIABLE LENGTH CELL STREAMS

(75) Inventors: Yehuda Moyal, Ra'anana (IL); Yehezkel Levi, Bat Yam (IL)

(73) Assignee: Cisco Systems O.I.A. (1988) Ltd. (IL)

( * ) Notice: Subject to any disclaimer, the term of this patent is extended or adjusted under 35 U.S.C. 154(b) by 778 days.

(21) Appl. No.: 09/751,568

(22) Filed: Dec. 29, 2000

(51) Int. Cl.[7] .................................................. H04J 3/06
(52) U.S. Cl. ........................ 370/503; 370/536; 370/542
(58) Field of Search ................................. 370/503, 509, 370/510, 511, 512, 514, 235, 241, 242, 243, 244, 245, 252, 412, 428, 429, 536, 537, 538, 540, 542

(56) References Cited

U.S. PATENT DOCUMENTS

| | | | |
|---|---|---|---|
| 4,825,300 A | | 4/1989 | Omori ........................ 358/328 |
| 5,333,299 A | * | 7/1994 | Koval et al. ................ 370/503 |
| 5,822,326 A | * | 10/1998 | Rainbolt ..................... 370/503 |
| 5,887,039 A | * | 3/1999 | Suemura et al. ............ 375/365 |
| 6,124,895 A | | 9/2000 | Fielder ........................ 348/515 |
| 6,173,380 B1 | * | 1/2001 | Jin et al. .................... 370/503 |
| 6,178,184 B1 | * | 1/2001 | Petty .......................... 370/503 |
| 6,546,065 B1 | * | 4/2003 | Shimosakoda .............. 375/364 |
| 6,578,092 B1 | * | 6/2003 | Lau et al. ..................... 710/29 |
| 6,625,176 B1 | * | 9/2003 | Amann et al. .............. 370/503 |
| 6,650,660 B1 | * | 11/2003 | Koehler et al. ............. 370/503 |
| 2002/0122438 A1 | * | 9/2002 | Mundkur et al. ........... 370/503 |

* cited by examiner

*Primary Examiner*—Chau Nguyen
*Assistant Examiner*—Brad Mace
(74) *Attorney, Agent, or Firm*—Schwegman, Lundberg, Woessner & Kluth, P.A.

(57) ABSTRACT

A novel and useful mechanism of synchronizing and aligning a plurality of data streams. The invention comprises a plurality of sync machines and an alignment circuit which in combination function to synchronize and align multiple variable length cell streams. Each sync machine is operative to control the output clocking of a corresponding FIFO queue. The data stream output of each FIFO queue is monitored by a sync machine and all the sync machines are coupled to the alignment circuit. In operation, the sync machines synchronize to the cells by searching for the error checks sequence (ECS) at the end of each cell. Upon synchronization being achieved for all the data streams, the alignment circuit causes each sync machine to freeze its respective FIFO until the ECS arrives on the data stream most delayed in time. Once the ECS is received on the slowest data stream, the alignment circuit releases the hold and consequently the FIFOs are released by the sync machines.

21 Claims, 6 Drawing Sheets

SYNCHRONIZATION AND ALIGNMENT OF MULTIPLE VARIABLE LENGTH CELL STREAMS

FIELD OF THE INVENTION

The present invention relates generally to data communication systems and more particularly relates to synchronization and alignment of multiple variable length cell streams.

BACKGROUND OF THE INVENTION

The world is currently witnessing explosive growth in the demand for communications networks and systems and it is predicted that this demand will increase in the future. The demand for data services is growing at an ever increasing rate. Meeting these demands requires communication networks having higher bandwidth capabilities. In an effort to meet this demand, carriers must install facilities that are capable of carrying increasing amounts of data traffic. Manufacturers of network equipment attempt to keep up with the demand by developing equipment that can handle higher bandwidths.

As network devices are required to handle higher and higher data rates, it becomes increasing difficult to process data serially due to the very clock rates involved. For example, an OC-48 rate of 2.4 Gbps has a period less then one half microsecond. In order to process data at such high rates, the input data streams are split into separate multiple streams and processed in parallel. The resultant parallel streams are then re-combined into a single output stream.

A block diagram illustrating an example synchronous data communications processing system is shown in FIG. 1. The communications device, generally referenced 10, comprises ingress data 18 that is input to a source module 12. The source module splits the input data stream into a plurality of individual data streams 13 that are then processed in parallel by processing modules 14. Each data stream may be processed by any number of processing modules #1 through #N. The processing modules may perform any type of processing. After processing is complete, the resultant individual data streams are combined at the destination 16 into a single output data stream 20.

A problem typically encountered is that the individual data streams encounter different delays along each of the processing paths. The delays can be caused by any reason but are typically caused by differing processing delays, signal propagation delays, etc. At the destination, however, the individual data streams must be aligned in time before they can be properly combined.

Thus there is a need for a mechanism that can synchronize and align multiple data streams for recombination into a single output data stream.

SUMMARY OF THE INVENTION

Accordingly, the present invention provides a novel and useful mechanism of synchronizing and aligning a plurality of data streams. The present invention is particularly useful in synchronous communication systems comprising one or more modules whereby data is input as a single input data streams, split into multiple data streams for processing and then combined into a single output data stream. The modules may comprise individual PCB cards in a system, individual systems connected over a network or may comprise different components on the same PCB.

For illustration purposes, the invention is described in the context of a communications device. Note, however, that it is not intended that the invention be limited to the examples presented herein. It is appreciated that one skilled in the art can apply the principles of the invention to other systems as well wherein it is required that a plurality of data streams be synchronized and aligned prior to being combined and output as a single data stream.

The invention comprises a plurality of sync machines and an alignment circuit which in combination function to synchronize and align multiple variable length cell streams. Each sync machine is operative to control the output clocking of a corresponding FIFO queue. The data stream output of each FIFO queue is monitored by a sync machine and all the sync machines are coupled to the alignment circuit. In operation, the sync machines synchronize to the cells by searching for the error checks sequence (ECS) at the end of each cell. Synchronization is achieved by counting bytes until the ECS. The ECS is then generated and compared to the ECS in the cell.

Upon synchronization being achieved for all the data streams, the alignment circuit is operative to cause each sync machine to freeze its respective FIFO until the ECS arrives on the data stream most delayed in time. Once the ECS is received on the slowest data stream, the alignment circuit releases the hold and consequently the FIFOs are released by the sync machines. Normal output clocking of the FIFOs then proceeds with all the data streams aligned in time.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC), Field Programmable Gate Array (FPGA) or functionally equivalent discrete hardware components.

There is thus provided in accordance with the present invention a method of aligning a plurality of data streams, each data stream comprising a series of cells, each cell comprising a data portion and an error check sequence (ECS), the method comprising the steps of synchronizing on each data stream independently by determining the start and end of each cell in accordance with its length, and generating a synchronization pulse upon the detection of the ECS in each cell, generating a hold signal upon the generation of a synchronization pulse produced in response to the last of the plurality of data streams to achieve synchronization, suspending the flow of each of the data streams in response to the assertion of the hold signal and upon the detection of the subsequent ECS within each particular data stream and resuming the flow of each of the data streams simultaneously upon the detection of the ECS associated with the most delayed in time data stream.

There is also provided in accordance with the present invention an alignment apparatus for aligning a plurality of data streams, each data stream comprising a series of cells, each cell comprising a data portion and an error check sequence (ECS) comprising a plurality of synchronization machines, each synchronization machine adapted to receive one of the data streams, determine the start and end of each cell in accordance with its length, and to generate a synchronization pulse upon the detection of the ECS in each cell, wherein each synchronization machine comprises suspension means adapted to suspend the flow of a particular data stream upon the assertion of a hold signal and the detection of the subsequent ECS within the particular data stream and adapted to resume the flow of the data stream in response to the de-assertion of the hold signal, an alignment mechanism operative to assert the hold signal upon the generation of a synchronization pulse produced in response to the last of the plurality of data streams to achieve synchronization, and to de-assert the hold signal, thus causing the simultaneous resumption of the flows of each the data stream, upon the detection of the ECS associated with the most delayed in time data stream.

There is further provided in accordance with the present invention a data communications system for processing an input data stream as a plurality of data streams, each data stream comprising a series of cells, each cell comprising a data portion and an error check sequence (ECS) comprising a receive line card adapted to receive and split the input data stream into a plurality of data streams, a plurality of processing cards, each processing card operative to process one of the data streams, a transmit line card operative to align and combine the plurality of data streams output of the processing cards into a single output data stream, the transmit line card comprising alignment means operative to synchronize on each data stream independently by determining the start and end of each cell in accordance with its length, and generating a synchronization pulse upon the detection of the ECS in each cell, generate a hold signal upon the generation of a synchronization pulse produced in response to the last of the plurality of data streams to achieve synchronization, suspend the flow of each of the data streams in response to the assertion of the hold signal and upon the detection of the subsequent ECS within each particular data stream and resume the flow of each of the data streams simultaneously upon the detection of the ECS associated with the most delayed in time data stream.

BRIEF DESCRIPTION OF THE DRAWINGS

The invention is herein described, by way of example only, with reference to the accompanying drawings, wherein.

DETAILED DESCRIPTION OF THE INVENTION

NOTATION USED THROUGHOUT

The following notation is used throughout this document.

| Term  | Definition                           |
|-------|--------------------------------------|
| ASIC  | Application Specific Integrated Circuit |
| CRC   | Cyclic Redundancy Check              |
| ECS   | Error Check Sequence                 |
| FIFO  | First In First Out                   |
| FPGA  | Field Programmable Gate Array        |
| IP    | Internet Protocol                    |
| OC    | Optical Carrier                      |
| PBX   | Private Branch Exchange              |
| PCB   | Printed Circuit Board                |
| PDU   | Protocol Data Unit                   |
| SONET | Synchronous Optical Network          |
| TCP   | Transmission Control Protocol        |

DETAILED DESCRIPTION OF THE INVENTION

The present invention is a mechanism for the synchronization and alignment of multiple data streams. The present invention is particularly useful in synchronous communication systems comprising one or more modules whereby data is input as a single input data streams, split into multiple data streams for processing and then combined into a single output data stream. The modules may comprise individual PCB cards in a system, individual systems connected over a network or may comprise different components on the same PCB.

For illustration purposes, the invention is described in the context of a communications device. Note, however, that it is not intended that the invention be limited to the examples presented herein. It is appreciated that one skilled in the art can apply the principles of the invention to other systems as well wherein it is required that a plurality of data streams be synchronized and aligned prior to being combined and output as a single data stream.

For purposes of this specification, the term 'communications device' shall be taken to mean any physical device used for the purposes of communications such as within a network, including but not limited to, a switch, router, hub, exchange, bridge, concentrator, workstation or terminal using any suitable protocol such as Ethernet, SONET, Token Ring, TCP, IP, etc.

Figure 1:
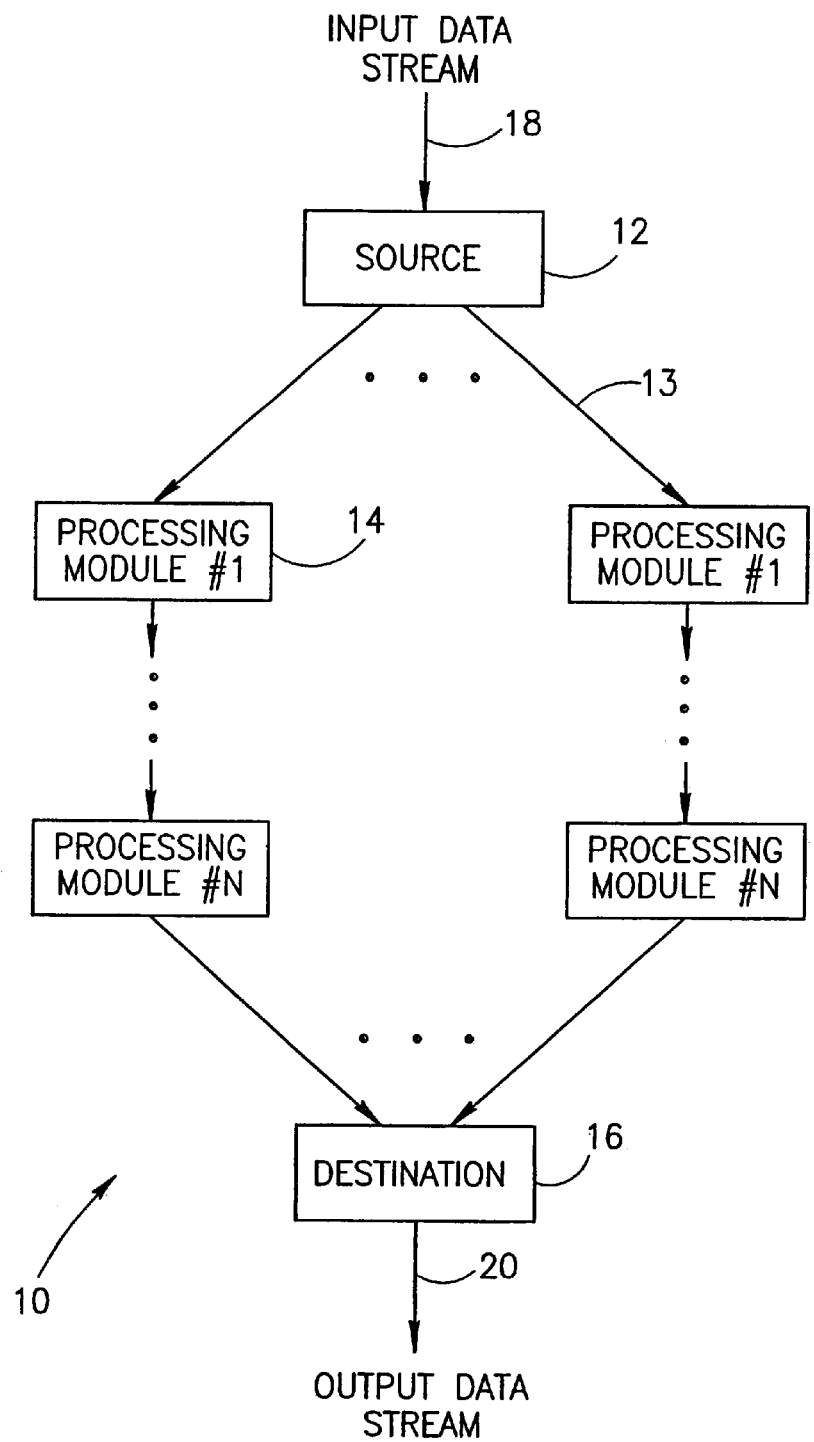
FIG. 1 is a block diagram illustrating an example synchronous data communications processing system.
Figure 2:
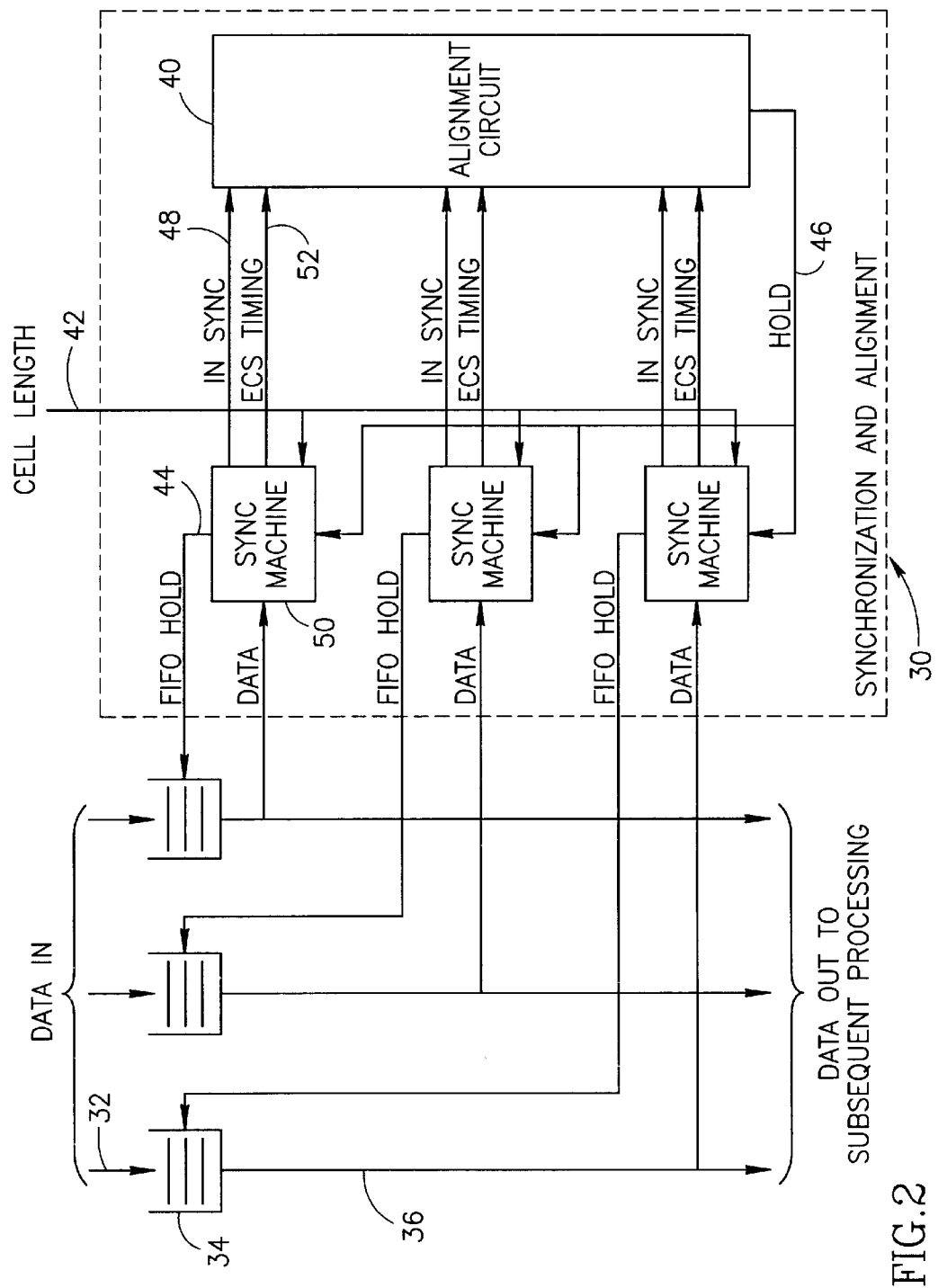
FIG. 2 is a block diagram illustrating a synchronization and alignment circuit constructed in accordance with the present invention.
Figure 3:
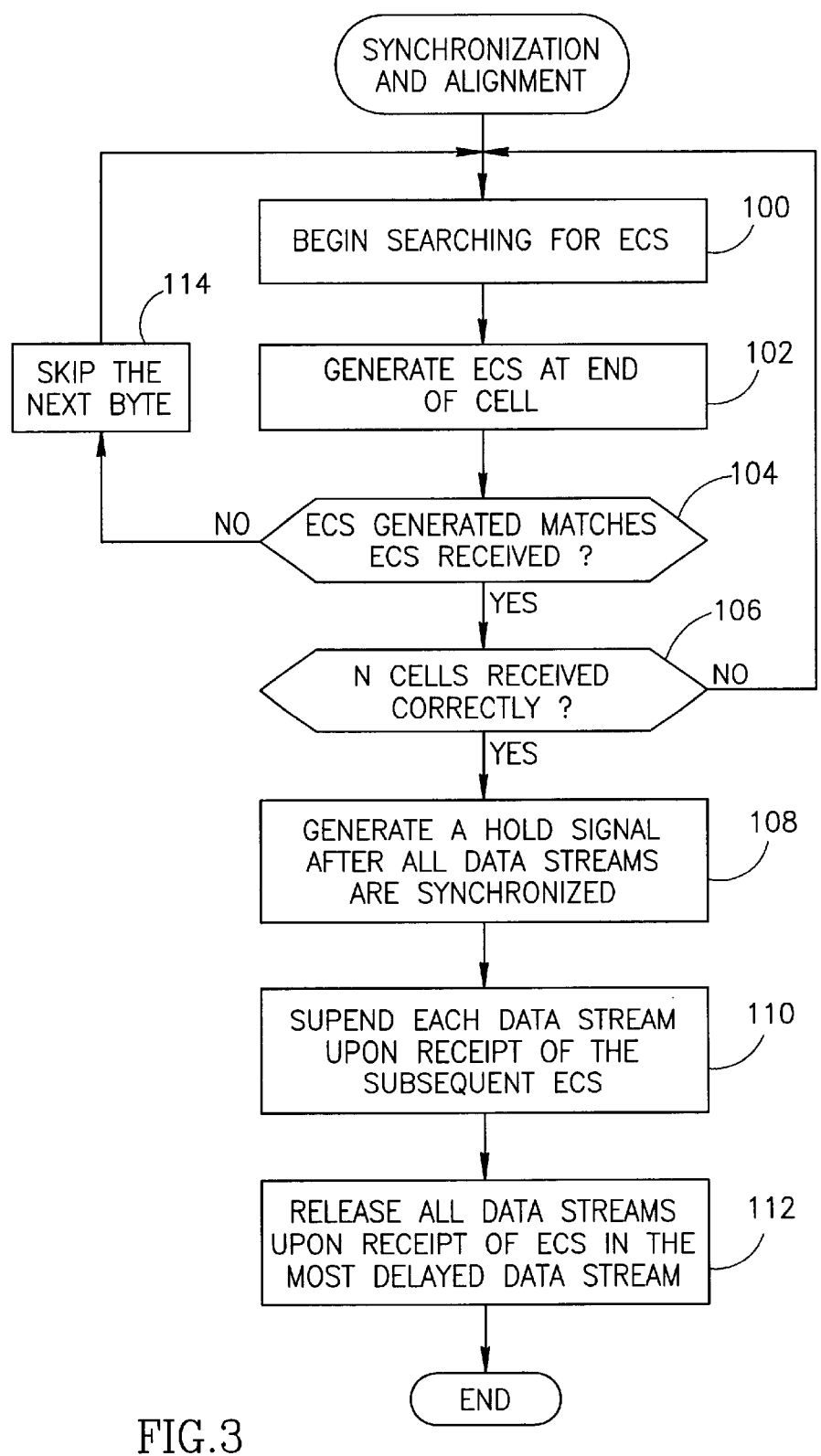
FIG. 3 is a flow diagram illustrating the synchronization and alignment method of the present invention.

A block diagram illustrating a synchronization and alignment circuit constructed in accordance with the present invention is shown in FIG. 2. A flow diagram illustrating the synchronization and alignment method of the present invention is shown in FIG. 3. With reference to FIGS. 2 and 3, the synchronization and alignment circuitry, generally referenced 30, comprises a plurality of sync machines 50 and an alignment circuit 40. The circuit is operative to receive the data streams at the output of FIFO queues 34. Within the device incorporating the invention, the data is clocked into and out of FIFO queues 34. The FIFO queues 34 are part of a data communications device operative to receive a plurality of data streams 32 to be synchronized and aligned. For example, the device may function to combine a plurality of data streams from multiple sources into a single stream. In this case, the multiple data streams must be synchronized and aligned before being combined.

It is assumed that each data stream comprises cells and that each cell within a data stream comprises, inter alia, a data portion and an error check sequence portion. The data streams are transmitted as a sequence of bytes. The synchronization and alignment circuitry is operative to align the plurality of data streams on the error check sequence (ECS) portion of the cells. The ECS portion may comprise any suitable error check sequence such as parity check codes, cyclic redundancy check (CRC) codes, etc.

The synchronization and alignment functions are performed by the synchronization and alignment circuitry 30 of the present invention. The sync machines function to synchronize to the timing of the alignment circuit 40 using the ECS portion of the cell. The sync machines are configured to monitor the data output of the FIFOs 34. Each data stream has a corresponding sync machine associated with it. Each FIFO 34 outputs data 36 not only to subsequent processing stages but also to one of the sync machines corresponding to it. Thus, the data input to each sync machine comprises the same stream of cells output to subsequent processing stages.

It is the function of each sync machine to acquire and maintain synchronization with the particular data stream input to it. To perform this function, each sync machine comprises a mechanism for counting the received bytes. Upon power up, i.e. reset, the sync machine begins searching for an ECS at the end of the cell (step 100). In accordance with the invention, the sync machine has knowledge of the length of a cell via the cell length input 95. At an arbitrary time, the sync machine declares a received byte as the first byte in the cell and begins counting bytes and calculating the ECS, i.e. the CRC, from that point on. With knowledge of the cell length, the sync machine counts bytes until it arrives at the ECS. An ECS (i.e. CRC) is then generated (step 102). The ECS generated is compared to the ECS received. If they match, the sync machine continues to receive cells until a predetermined number N of cells are received correctly at which time synchronization is declared and the signal IN SYNC 48 is asserted. The sync machine is operative to check for a plurality N of cells to be correctly received in order to ensure correct timing has been achieved (step 106). The number N is typically set to ten or less, e.g., five. A cell is received correctly if the ECS generated matches the ECS received in the cell.

If the ECS generated by the sync machine does not match that received in the cell, the next byte is skipped (step 114) and the search for the ECS resumes. Thus, an incorrect ECS indicates that synchronization has not been achieved. In other words, the sync machine framing is not matched to that of the received cell stream. To achieve synchronization, the sync machine skips the next byte in order to alter the framing. It then counts bytes until the ECS byte at which time the generated ECS is again compared with the receive ECS. If they do not match, the process is repeated.

Note that in the worst case, synchronization is achieved after a cell length number of bytes. This corresponds to the case where counting started at the actual second byte in a cell. In this case, the process of skipping a byte must be performed a complete cell length number of bytes in order to arrive at the actual first byte in the cell.

As an example, assume the number of bytes in a cell is 39, with 38 data bytes and one ECS byte. In this case, the sync machine is operative to count 38 bytes and compare the ECS generated to the ECS received. If they do not match, the next byte is skipped and the process is repeated. If they do match, the sync machine continues to check the ECS in subsequent cells until N correct cells are received at which point synchronization is declared.

In accordance with the invention, each sync machine is operative to generate a pulse ECS TIMING 52 upon the receipt of an ECS in its input cell stream. The sync machine counts bytes to determine the position of the ECS. In the cell format presented herein, the ECS is located in the last byte. Thus, the pulse ECS TIMING is generated after cell length minus one bytes are received. The pulse duration is one byte long.

The alignment circuit is adapted to receive the IN SYNC and ECS TIMING signals from all sync machines. When the IN SYNC signal is asserted by all sync machines, the alignment circuit is operative to generate a HOLD signal 46 (step 108). The HOLD signal is not generated until all the sync machines have achieved synchronization. The HOLD signal is fed back in common to each of the sync machines.

In response to receipt of a HOLD signal, each sync machine asserts its FIFO HOLD signal 44 upon the arrival of the next ECS (step 110). The FIFO HOLD signal is continually asserted even after the duration of the ECS pulse until the HOLD signal is de-asserted. The FIFO HOLD signal can be generated by latching the AND of the HOLD and ECS TIMING signals until the HOLD signal is de-asserted at which point the FIFO HOLD is de-asserted.

Each FIFO HOLD signal controls the output clocking of one of the FIFOs. The assertion of the FIFO HOLD signal causes the FIFO to suspend the outputting of data 36 from the FIFO. The clocking of input data 32 may or may not also be suspended depending on the particular implementation of the device and is not critical to operation of the invention.

The alignment circuit is operative to maintain the HOLD signal until the ECS TIMING signal is received from the sync machine corresponding to the most delayed in time data stream (step 112). Upon receipt of the last ECS TIMING signal from the most delayed in time data stream, the alignment circuit is operative to de-assert the HOLD signal. The de-assertion of the HOLD signal causes each of the sync machines to de-assert their FIFO HOLD signals. The de-assertion of the FIFO HOLD signal releases the corresponding FIFO so that the clocking of data out of the FIFO is resumed.

Since the HOLD signal is common to all sync machines, the FIFO HOLD signals are de-asserted simultaneously thus releasing all FIFOs at the same time. This results in the simultaneous resumption of the clocking of data out of the FIFOs and the consequent alignment of all the data streams.

Note that the FIFO HOLD signal associated with the most delayed in time data stream does not get asserted, since it is not necessary to freeze the FIFO associated with this data stream as it is the data stream most delayed in time and the one all the other data streams must wait for.

It is not intended that the invention be limited to the embodiments shown herein or to a particular number of data streams. It is appreciated that one skilled in the art can modify the synchronization and alignment circuit of the present invention to handle any number of desired data streams. Further, the invention can be adapted to operate with cells, packets, frames or any other type of protocol data unit (PDU).

Note that in accordance with the invention, the cell length 42 is provided to the sync machines in order that they know how many bytes are contained in a cell. Note that the number of bytes in a cell may vary from cell to cell or may be fixed. In the case there the cell length is fixed, the cell length input is not required. Note, however, that the cell length at any point in time is required to apply to all the data streams simultaneously. In other words, the cells of two different data streams cannot have different cell lengths. At the beginning of each cell, the sync machines are operative to retrieve the cell length from the cell length input signal. The cell length is then used to determine the location in the cell of the ECS. Thus, the sync machine can maintain synchronization as long as it knows how many bytes to count from the beginning of a cell until the ECS.

Once the input data streams are initially aligned, the present invention provides a mechanism to maintain alignment. Alignment is maintained by detecting when a data stream goes out of sync. When this happens, the corresponding sync, machine de-asserts its IN SYNC signal. The alignment circuit comprises means for detecting when one or more of the sync machines are out of sync. This can be achieved by ANDing the IN SYNC signals.

Upon detecting that one or more of the sync machines is out of sync, the alignment circuit generates the HOLD signal again and the alignment process described above is repeated, i.e. FIFO output clocking is suspended until the ECS of the most delayed in time data stream is received.

Figure 4:
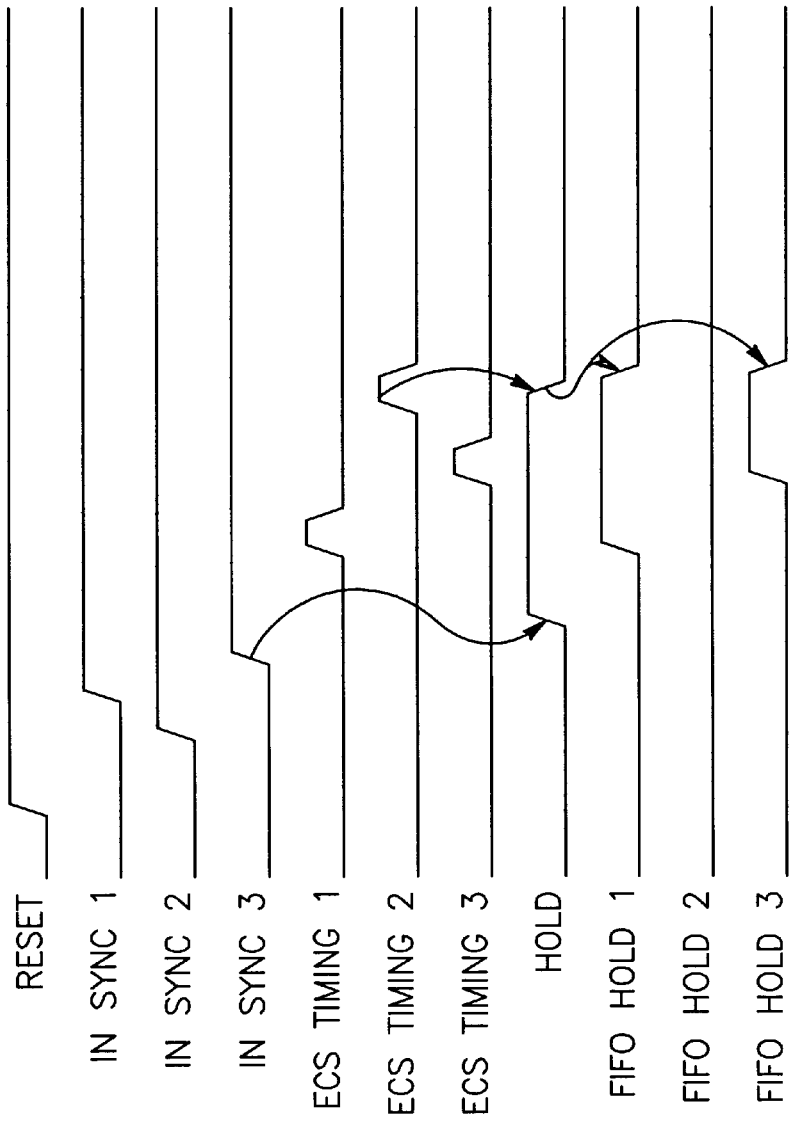
FIG. 4 is a timing diagram illustrating the timing of the various signals in the synchronization and alignment circuit of the present invention.

A timing diagram illustrating the timing of the various signals in the synchronization and alignment circuit of the present invention is shown in FIG. 4. The timing signals correspond to the three data streams and FIFOs shown in FIG. 2. With reference to FIGS. 2 and 3, after RESET, the sync machines begin synchronizing to the received cell data streams by searching for the ECS in each cell, in accordance with the process described hereinabove. Once synchronization is achieved, the corresponding IN SYNC signal is asserted. Note that synchronization is achieved by each of the sync machines at different times that is indicated by the different timing of the assertion of the three IN SYNC signals. Once the IN SYNC is asserted, the ECS TIMING pulse is generated upon the reception of the ECS in each cell.

As described supra, due to the variations in processing delays, propagation path lengths, etc., the data streams are misaligned. This is indicated by the skewed timing between the three ECS TIMING pulses. Once all the data streams are synchronized, the alignment circuit generates the HOLD signal. In response to the HOLD signal, each sync machine asserts its corresponding FIFO HOLD signal upon the receipt of the next ECS. Thus, each FIFO HOLD signal is asserted upon the occurrence of the next ECS TIMING pulse. The FIFO HOLD signal causes the output clocking of the corresponding FIFO to be suspended.

The FIFO HOLD signals are de-asserted upon the occurrence of the ECS TIMING pulse of the data stream most delayed in time. In this example, data stream #2 is most delayed in time and thus, data streams #1 and #3 must wait for the arrival of the ECS TIMING #2 pulse before they can be resumed. The arrival of the ECS TIMING #2 pulse causes the de-assertion of the HOLD signal and the consequent de-assertion of FIFO HOLD #1 and FIFO HOLD #3 signals. As indicated, the FIFO HOLD #2 signal never gets asserted because data stream #2 is the most delayed.

Figure 5:
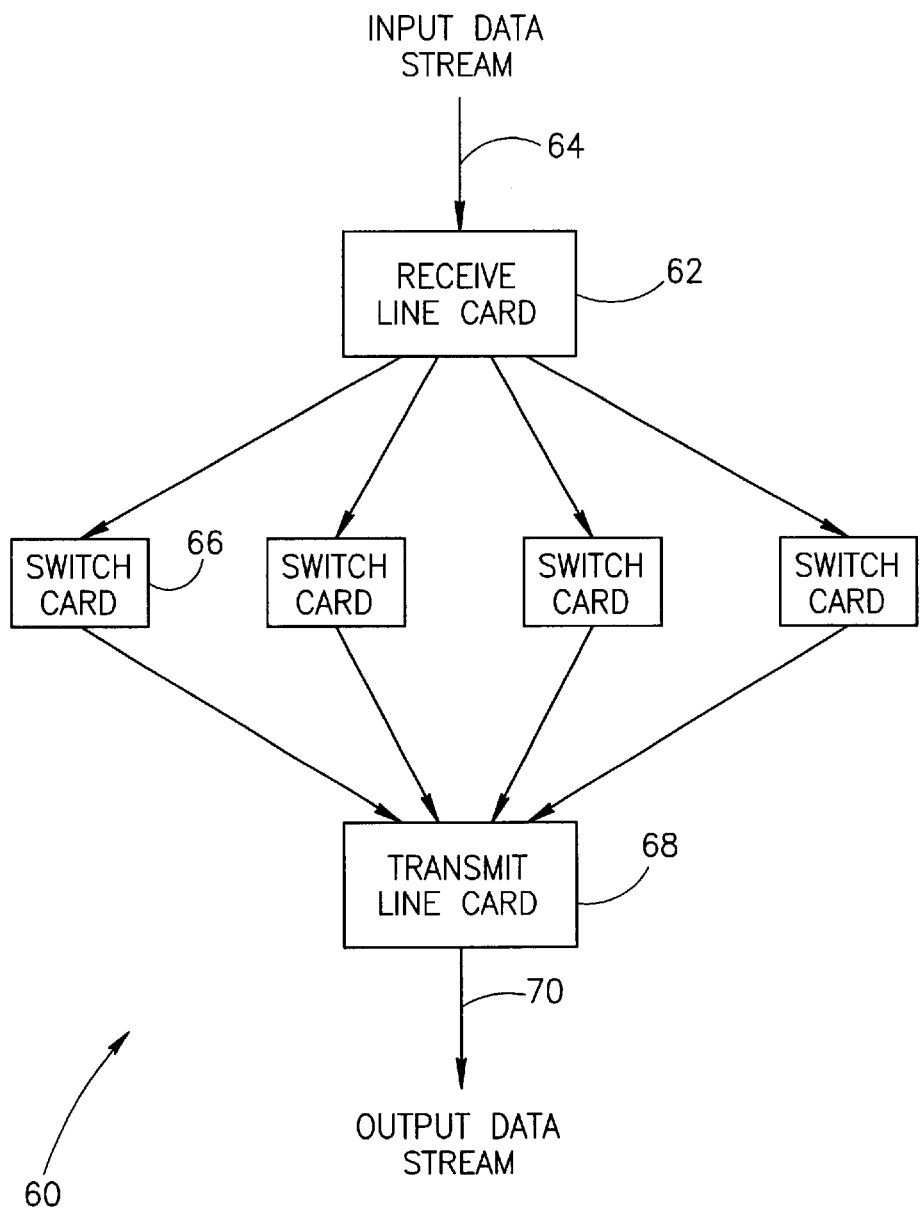
FIG. 5 is a block diagram illustrating an example synchronous communications system incorporating the synchronization and alignment circuit of the present invention.

A block diagram illustrating an example synchronous communications system incorporating the synchronization and alignment circuit of the present invention is shown in FIG. 5. The communications device, generally referenced 60, in this example embodiment is intended to represent the typical architecture of a communications processing device or system such as a switching device. Such a system may comprise a plurality of modules or printed circuit cards whereby data is transmitted from one card to another. The input data stream 64 is input to a receive line card 62 which is operative to split the input data stream into a plurality of data streams which are then processed by one or more switch cards 66. The outputs of each switch card are then collected and combined into a single output data stream 70 via the transmit line card 68.

By the time the separate data streams arrive at the transmit line card, they have experienced different processing delays, propagation delays, etc. and are thus misaligned. In order to correctly combine the separate data streams into a single data stream, the individual data streams must be properly aligned. In order to achieve alignment, the transmit line card incorporates the synchronization and alignment circuit of the present invention.

Figure 6:
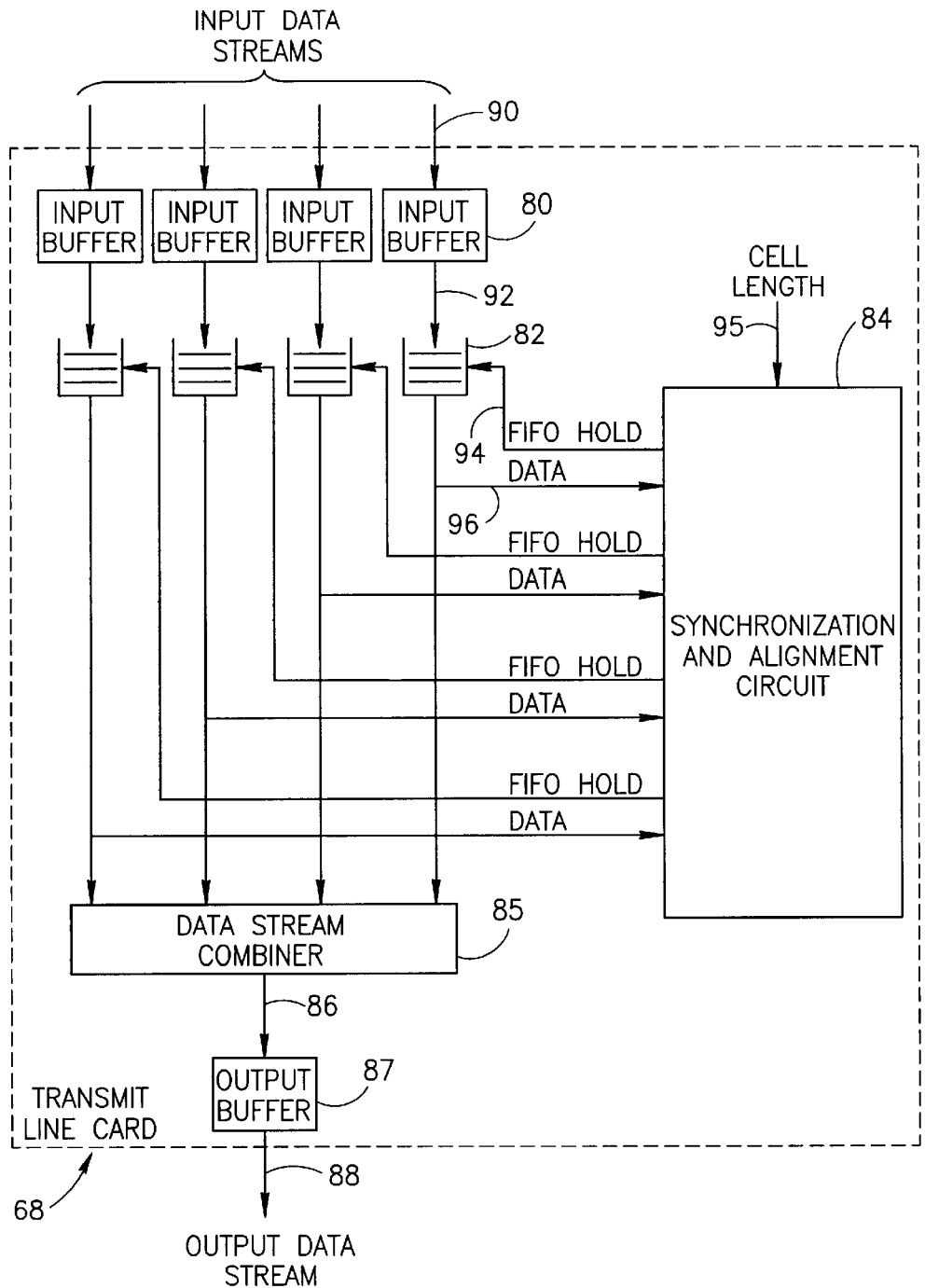
FIG. 6 is a block diagram illustrating the transmit line card of FIG. 5 in more detail.

A block diagram illustrating the transmit line card of FIG. 5 in more detail is shown in FIG. 6. The separate data streams 90 are collected in the transmit line card 68 which comprises, inter alia, a plurality of input buffers 80, a plurality of FIFOs 82, a data stream combiner circuit 85, output buffer 87 and synchronization and alignment circuit 84.

In operation, the separate input data streams 90 are received by the input buffers 80. In this example, the transmit line card is operative to receive and combine four data streams into a single stream. It is appreciated that any number of data streams may be aligned using the techniques of the present invention.

The output data 92 from the input buffers is clocked into the FIFOs 82. The data 96 is clocked out of the FIFOs and into the data stream combiner 85 that is operative to combine the individual data streams into a single stream 86. The single data stream is then buffered by output buffer 87. The output data stream 88 is produced by the output buffer. The data clocked out of the FIFOs is also input to the sync machines within the synchronization and alignment circuit.

In accordance with the present invention, the output clocking of the FIFOs is controlled by the FIFO HOLD signals 94 generated by the synchronization and alignment circuit. Note that the construction and operation of the synchronization and alignment circuit 84 is similar to that of the synchronization and alignment circuit 30 in FIG. 2. The different being that here, the circuit is operative to synchronize and align four data streams rather than three. Note, however, that the present invention can be adapted to handle any number of data streams.

As described supra, in accordance with the invention, each sync machine synchronizes to the individual cell streams input thereto. The alignment circuit then asserts the HOLD signal with causes each sync machine to freeze its corresponding FIFO upon the subsequent ECS received. Eventually, three of the four FIFOs become suspended and data ceases to be clocked out of them. Upon the receipt of the ECS in the fourth data stream (i.e. the data stream most delayed in time) the FIFOs associated with the other three data streams are unfrozen thus resulting in the alignment of all four data streams. Output data clocking of the three FIFOs previously frozen resumes and all four data streams are now in alignment.

Note that the cell length 95 is provided to the sync machines in order that they know how many bytes are contained in a cell. Note that as described above, the number of bytes in a cell may vary from cell to cell or may-be fixed. In the case there the cell length is fixed, the cell length input is not required.

In alternative embodiments, the present invention may be applicable to implementations of the invention in integrated circuits or chip sets, e.g., Application Specific Integrated Circuits (ASICs), Field Programmable Gate Arrays (FPGAs), etc., wireless implementations, switching system products and transmission system products, e.g., SONET based products. For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of aligning a plurality of data streams, each data stream comprising a series of cells, each cell comprising a data portion and an error check sequence (ECS), said method comprising the steps of:

synchronizing on each data stream independently by determining the start and end of each cell in accordance with its length, and generating a synchronization pulse upon the detection of the ECS in each cell;

generating a hold signal upon the generation of a synchronization pulse produced in response to the last of said plurality of data streams to achieve synchronization;

suspending the flow of each of said data streams in response to the assertion of said hold signal and upon the detection of the subsequent ECS within each particular data stream; and resuming the flow of each of said data streams simultaneously upon the detection of the ECS associated with the most delayed in time data stream.

2. The method according to claim 1, wherein said step of synchronizing is performed with the knowledge of a fixed length known a priori.

3. The method according to claim 1, wherein said step of synchronizing is performed using a length that is variable on a per cell basis and that is common at any one time across all data streams in parallel.

4. The method according to claim 1, wherein said step of synchronizing is performed using a length that is provided on a per cell basis by an external entity.

5. The method according to claim 1, wherein said synchronization pulse is generated only after the detection of a predetermined number of correct error check sequences.

6. The method according to claim 1, wherein said step of suspending the flow of each of said data streams comprises suspending the clock input to a first in first out (FIFO) queue associated with each data stream.

7. The method according to claim 1, wherein said step of resuming the flow of each of said data streams comprises resuming the clocking of a plurality of first in first out (FIFO) queues, each FIFO queue associated with a single data stream.

8. An alignment apparatus of aligning a plurality of data streams, each data stream comprising a series of cells, each cell comprising a data portion and an error check sequence (ECS), comprising:

a plurality of synchronization machines, each synchronization machine adapted to receive one of said data streams, determine the start and end of each cell in accordance with its length, and to generate a synchronization pulse upon the detection of the ECS in each cell, wherein each synchronization machine comprises suspension means adapted to suspend the flow of a particular data stream upon the assertion of a hold signal and the detection of the subsequent ECS within the particular data stream and adapted to resume the flow of said data stream in response to the de-assertion of said hold signal;

an alignment mechanism operative to assert said hold signal upon the generation of a synchronization pulse produced in response to the last of said plurality of data streams to achieve synchronization, and to de-assert said hold signal, thus causing the simultaneous resumption of the flows of each said data stream, upon the detection of the ECS associated with the most delayed in time data stream.

9. The apparatus according to claim 8, wherein each said synchronization machine is adapted to determine the start and end of each cell utilizing a fixed length known a priori.

10. The apparatus according to claim 8, wherein each said synchronization machine is adapted to determine the start and end of each cell using a length that is variable on a per cell basis and which is common at any moment in time across all data streams in parallel.

11. The apparatus according to claim 8, wherein each said synchronization machine is adapted to determine the start and end of each cell using a length that is provided on a per cell basis by an external entity.

12. The apparatus according to claim 8, wherein each said synchronization machine is adapted to generate said synchronization pulse only after the detection of a predetermined number of correct error check sequences.

13. The apparatus according to claim 8, wherein said synchronization machine is adapted to suspend the flow of each data stream by suspending the clock input to a first in first out (FIFO) queue associated with each data stream.

14. The apparatus according to claim 8, wherein said synchronization machine is adapted to resume the flow of each data stream by resuming the clocking of a plurality of first in first out (FIFO) queues, each FIFO queue associated with a single data stream.

15. A data communications system for processing an input data stream as a plurality of data streams, each data stream comprising a series of cells, each cell comprising a data portion and an error check sequence (ECS), comprising:

a receive line card adapted to receive and split said input data stream into a plurality of data streams;

a plurality of processing cards, each processing card operative to process one of said data streams;

a transmit line card operative to align and combine the plurality of data streams output of said processing cards into a single output data stream, said transmit line card comprising alignment means operative to:

synchronize on each data stream independently by determining the start and end of each cell in accordance with its length, and generating a synchronization pulse upon the detection of the ECS in each cell;

generate a hold signal upon the generation of a synchronization pulse produced in response to the last of said plurality of data streams to achieve synchronization;

suspend the flow of each of said data streams in response to the assertion of said hold signal and upon the detection of the subsequent ECS within each particular data stream; and resume the flow of each of said data streams simultaneously upon the detection of the ECS associated with the most delayed in time data stream.

16. The system according to claim 15, wherein each data stream is synchronized using a fixed length known a priori.

17. The system according to claim 15, wherein each data stream is synchronized using a length that is variable on a per cell basis and that is common at any one time across all data streams in parallel.

18. The system according to claim 15, wherein each data stream is synchronized using a length that is provided on a per cell basis by an external entity.

19. The system according to claim 15, wherein said synchronization pulse is generated only after the detection of a predetermined number of correct error check sequences.

20. The system according to claim 15, wherein the flow of each of said data streams is suspended by suspending the clock input to a first in first out (FIFO) queue associated wvith each data stream.

21. The system according to claim 15, wherein the flow of each of said data streams is resumed by resuming the clocking of a plurality of first in first out (FIFO) queues, each FIFO queue associated with a single data stream.

* * * * *

UNITED STATES PATENT AND TRADEMARK OFFICE
CERTIFICATE OF CORRECTION

PATENT NO. : 6,834,058 B1
DATED : December 21, 2004
INVENTOR(S) : Moyal et al.

It is certified that error appears in the above-identified patent and that said Letters Patent is hereby corrected as shown below:

Column 12,
Line 11, delete "wvith" and insert -- with --, therefor.

Signed and Sealed this

Twenty-first Day of June, 2005

JON W. DUDAS
*Director of the United States Patent and Trademark Office*